US009830712B2

United States Patent
Kim

(10) Patent No.: US 9,830,712 B2
(45) Date of Patent: Nov. 28, 2017

(54) METHOD AND APPARATUS FOR SENSING MOVING BALL

(71) Applicant: GOLFZON Co., Ltd., Daejeon (KR)

(72) Inventor: Se Hwan Kim, Daegu (KR)

(73) Assignee: GOLFZON CO., LTD., Daejeon (KR)

(*) Notice: Subject to any disclaimer, the term of this patent is extended or adjusted under 35 U.S.C. 154(b) by 106 days.

(21) Appl. No.: 14/759,655

(22) PCT Filed: Jan. 8, 2014

(86) PCT No.: PCT/KR2014/000200
§ 371 (c)(1),
(2) Date: Jul. 8, 2015

(87) PCT Pub. No.: WO2014/109546
PCT Pub. Date: Jul. 17, 2014

(65) Prior Publication Data
US 2015/0356748 A1 Dec. 10, 2015

(30) Foreign Application Priority Data
Jan. 8, 2013 (KR) .................. 10-2013-0002206

(51) Int. Cl.
G06T 7/20 (2017.01)
H04N 13/02 (2006.01)
(Continued)

(52) U.S. Cl.
CPC .............. *G06T 7/2086* (2013.01); *G06K 9/78* (2013.01); *G06T 7/246* (2017.01); *G06T 7/285* (2017.01);
(Continued)

(58) Field of Classification Search
CPC ............ A63B 2220/35; A63B 69/3658; A63B 24/0021; A63B 2024/0034;
(Continued)

(56) References Cited

U.S. PATENT DOCUMENTS 6,327,388 B1* 12/2001 Zhou ................. G06F 17/30259
382/203
2002/0022531 A1* 2/2002 Katayama .......... A63B 24/0021
473/151
(Continued)

FOREIGN PATENT DOCUMENTS

JP 2000-019186 A 1/2000
JP 2005-087615 A 4/2005
(Continued)

OTHER PUBLICATIONS

International Search Report for PCT/KR2014/000200 dated Feb. 28, 2014 from Korean Intellectual Property Office.

Primary Examiner — Kim Vu
Assistant Examiner — Michael Vanchy, Jr.
(74) Attorney, Agent, or Firm — Revolution IP, PLLC

(57) ABSTRACT

Disclosed are an apparatus for sensing a moving golf ball and a method for sensing the moving golf ball using the apparatus. The apparatus includes an image acquisition unit for acquiring consecutive images of a ball, an image processing unit for extracting a feature portion of the ball from the acquired images, and a spin calculation unit for performing any one of forward operation analysis and inverse operation analysis to calculate spin of the ball.

7 Claims, 11 Drawing Sheets

(51) Int. Cl.
- *G06K 9/78* (2006.01)
- *G06T 7/00* (2017.01)
- *G06T 7/73* (2017.01)
- *G06T 7/593* (2017.01)
- *G06T 7/246* (2017.01)
- *G06T 7/285* (2017.01)
- *G03B 35/08* (2006.01)

(52) U.S. Cl.
CPC .............. *G06T 7/593* (2017.01); *G06T 7/73* (2017.01); *H04N 13/0239* (2013.01); *G03B 35/08* (2013.01); *G06K 2209/25* (2013.01); *G06T 2207/10021* (2013.01); *G06T 2207/30204* (2013.01)

(58) Field of Classification Search
CPC . A63B 2102/32; A63B 69/36; A63B 71/0619; G06T 7/20; G06T 2207/10021; G06T 7/593; G06T 7/70; G06T 7/74; H04N 2013/0085; A63F 13/005; A63F 13/213; A63F 13/812; G06K 2209/25

See application file for complete search history.

(56) References Cited

U.S. PATENT DOCUMENTS

| | | |
|---|---|---|
| 2004/0030527 A1 | 2/2004 | Rankin |
| 2005/0215336 A1 | 9/2005 | Ueda et al. |
| 2006/0008116 A1* | 1/2006 | Kiraly ............... G06T 7/20 382/103 |
| 2012/0082347 A1 | 4/2012 | Kim et al. |
| 2015/0350609 A1* | 12/2015 | Kim ............... H04N 7/181 348/47 |

FOREIGN PATENT DOCUMENTS

| | | |
|---|---|---|
| JP | 2005-270500 A | 10/2005 |
| JP | 2006-505292 A | 2/2006 |
| KR | 10-2012-0033946 A | 4/2012 |

* cited by examiner

FIRST FEATURE PORTION IMAGE

SECOND FEATURE PORTION IMAGE

FIRST FEATURE PORTION IMAGE

SECOND FEATURE PORTION IMAGE

METHOD AND APPARATUS FOR SENSING MOVING BALL

CROSS REFERENCE TO PRIOR APPLICATIONS

This application is a National Stage Application of PCT International Patent Application No. PCT/KR2014/000200 filed on Jan. 8, 2014, under 35 U.S.C. §371, which claims priority to Korean Patent Application No. 10-2013-0002206 filed on Jan. 8, 2013, which are all hereby incorporated by reference in their entirety.

TECHNICAL FIELD

The present invention relates to a method and apparatus for sensing a moving ball for acquiring an image of the moving ball and processing and analyzing the image to calculate the spin of the ball.

BACKGROUND ART

With regard to sports games, specifically, golf, attempts have always been made to accurately sense the physical characteristics of a moving ball that is hit by a golfer, to analyze the ball in flight or to realize the ball in flight in the form of an image using the sensed value, and to apply the result to simulated golf such as so-called screen golf.

In particular, when a ball is hit to fly, the ball rotates at very high speed with respect to an axis in a three-dimensional (3D) space, and thus, it is very difficult to measure spin of the ball and very expensive equipment is required to accurately measure the spin of the ball. A representative method for measuring spin of a ball is a method using a radar sensor.

However, such an expensive sensing apparatus is not appropriate for a general-purpose sensing apparatus for analysis of a ball in flight in so-called screen golf or on a driving range, which senses a ball in flight according to golf swing, calculates a trajectory of the ball, and allows golf simulation on a virtual golf course based on the calculated trajectory. There is a need to a technology for rapidly and accurately sensing spin of a ball also in a relatively inexpensive and low-performance system.

DISCLOSURE

Technical Problem

Therefore, the present invention has been made in view of the above problems, and it is an object of the present invention to provide an apparatus and method for sensing a moving ball, which extract a feature portion such as a trademark, a logo, etc. indicated on a ball from consecutive images of a moving ball, acquired by an image acquisition unit embodied by a predetermined camera device, and rapidly, and accurately calculate spin of the ball, specifically, even when only a portion of the feature portion indicated on the image remains due to rotation of the ball so as to calculate a spin axis and spin amount of rotation the moving ball based on the feature portion and thus spin of the ball is rapidly and accurately calculated, thereby achieving rapid and stable calculation of the ball in a relatively low performance system.

Technical Solution

In accordance with an aspect of the present invention, the above and other objects can be accomplished by the provision of an apparatus for sensing a moving ball, for acquiring and analyzing an image of the moving ball to calculate spin of the moving ball, the apparatus including an image acquisition unit for acquiring consecutive images according to movement of a ball with a surface having a predetermined feature portion indicated thereon, an image processing unit for extracting a feature portion of a ball portion on a first image as a preceding image of two consecutively acquired images and a feature portion of a ball portion on a second image as a subsequent image of the two consecutively acquired images, and a spin calculation unit for calculating a spin axis and spin amount according to movement of a ball from the first image to the second image by selectively performing, according to preset information, any one of forward operation analysis for comparing and analyzing a result obtained by applying a trial spin axis and spin amount to the feature portion of the ball portion on the first image and the feature portion on the second image and inverse operation analysis for comparing and analyzing a result obtained by applying a trial spin axis and spin amount to the feature portion of the ball portion on the second image and the feature portion on the first image.

In accordance with another aspect of the present invention, there is provided a method of sensing a moving ball, for acquiring and analyzing an image of the moving ball to calculate spin of the moving ball, the method including acquiring consecutive images according to movement of a ball with a surface having a predetermined feature portion indicated thereon, extracting a first feature portion as a feature portion of a ball portion on a first image as a preceding image of the two consecutively acquired images and a second feature portion as a feature portion of a ball portion on a second image as a subsequent image of the two consecutively acquired images, determining whether spin is calculated using forward operation analysis for comparing and analyzing a result obtained by applying a trial spin axis and spin amount to the first feature portion and the second feature portion or inverse operation analysis for comparing and analyzing a result obtained by applying a trial spin axis and spin amount to the first feature portion and the second feature portion, and calculating a spin axis and spin amount according to movement of a ball from the first image to the second image by selectively performing any one of the forward operation analysis and the inverse operation analysis according to a result of the determining.

In accordance with another aspect of the present invention, there is provided a method of sensing a moving ball, for acquiring and analyzing an image of the moving ball to calculate spin of the moving ball, the method including acquiring consecutive images according to movement of a ball with a surface having a predetermined feature portion indicated thereon, preparing a first feature portion as a feature portion of a ball portion on a first image as a preceding image of the two consecutively acquired images and a second feature portion as a feature portion of a ball portion on a second image as a subsequent image of the two consecutively acquired images, comparing the first feature portion as the feature portion on the first feature portion image and a second feature portion as the feature portion on the second feature portion image to select a spin operation method, and selectively performing any one of forward operation analysis for applying trial spin information to the first feature portion and comparing the first feature portion and the second feature portion and inverse operation analysis for applying trial inverse spin information to the second feature portion and comparing the first feature portion and the second feature portion, according to a result of the selecting, to search for a spin axis and spin amount in 3D space for allowing the first feature portion image to be converted into the second feature portion image.

Advantageous Effects

An apparatus and method for sensing a moving ball according to the present invention may extract a feature portion such as a trademark, a logo, etc. indicated on a ball from consecutive images of a moving ball, acquired by an image acquisition unit embodied by a predetermined camera device, and rapidly, and accurately calculate spin of the ball, specifically, even when only a portion of the feature portion indicated on the image remains due to rotation of the ball so as to calculate a spin axis and spin amount of rotation the moving ball based on the feature portion and thus spin of the ball is rapidly and accurately calculated, thereby achieving rapid and stable calculation of the ball in a relatively low performance system.

DESCRIPTION OF DRAWINGS

The above and other objects, features and other advantages of the present invention will be more clearly understood from the following detailed description taken in conjunction with the accompanying drawings, in which.

BEST MODE

Hereinafter, exemplary embodiments of a method and apparatus for sensing a moving ball according to the present invention will be described in detail with reference to the accompanying drawings.

The present invention may be basically configured to photograph a golf ball (hereinafter, referred to as a "ball"), which is hit by a golf club of a user, via a predetermined camera, to analyze the captured image, and to calculate spin of the ball in flight. Here, the camera may be a three-dimensional (3D) camera or a stereo camera configured by a plurality of cameras in a stereo manner and may be configured to convert coordinates of a two-dimensional (2D) image of the ball into 3D coordinates or vice versa.

In addition, the method and apparatus for sensing a moving ball according to the present invention may be applied to various fields such as analysis of a ball in flight according to golf swing of a user, a virtual golf using a virtual reality-based simulation, and so on.

First, an apparatus for sensing a moving ball according to an embodiment of the present invention will be described with reference to FIGS. 1 and 2.

Figure 1:
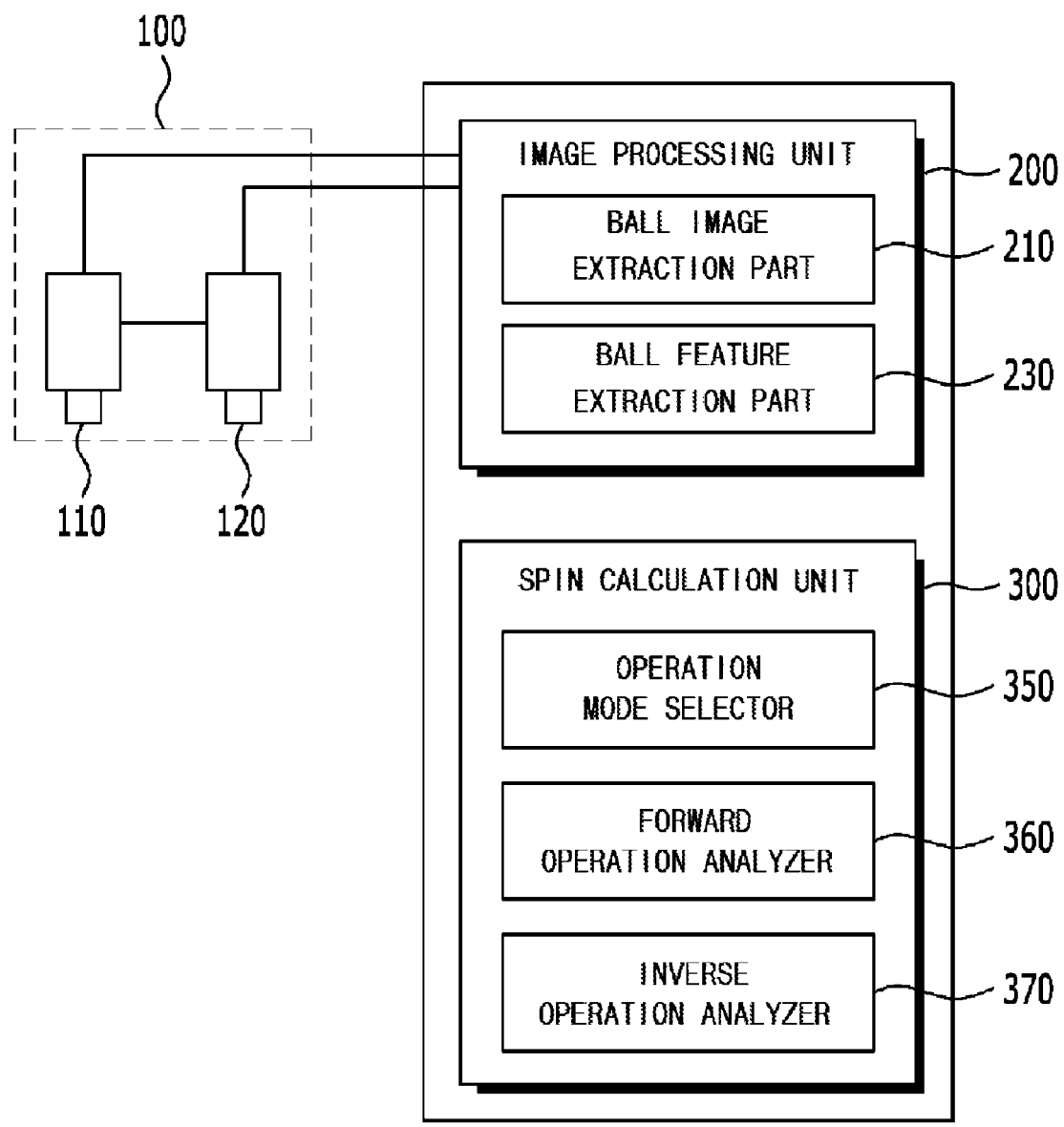
FIG. 1 is a schematic block diagram illustrating a structure of an apparatus for sensing a moving ball according to an embodiment of the present invention.
Figure 2:
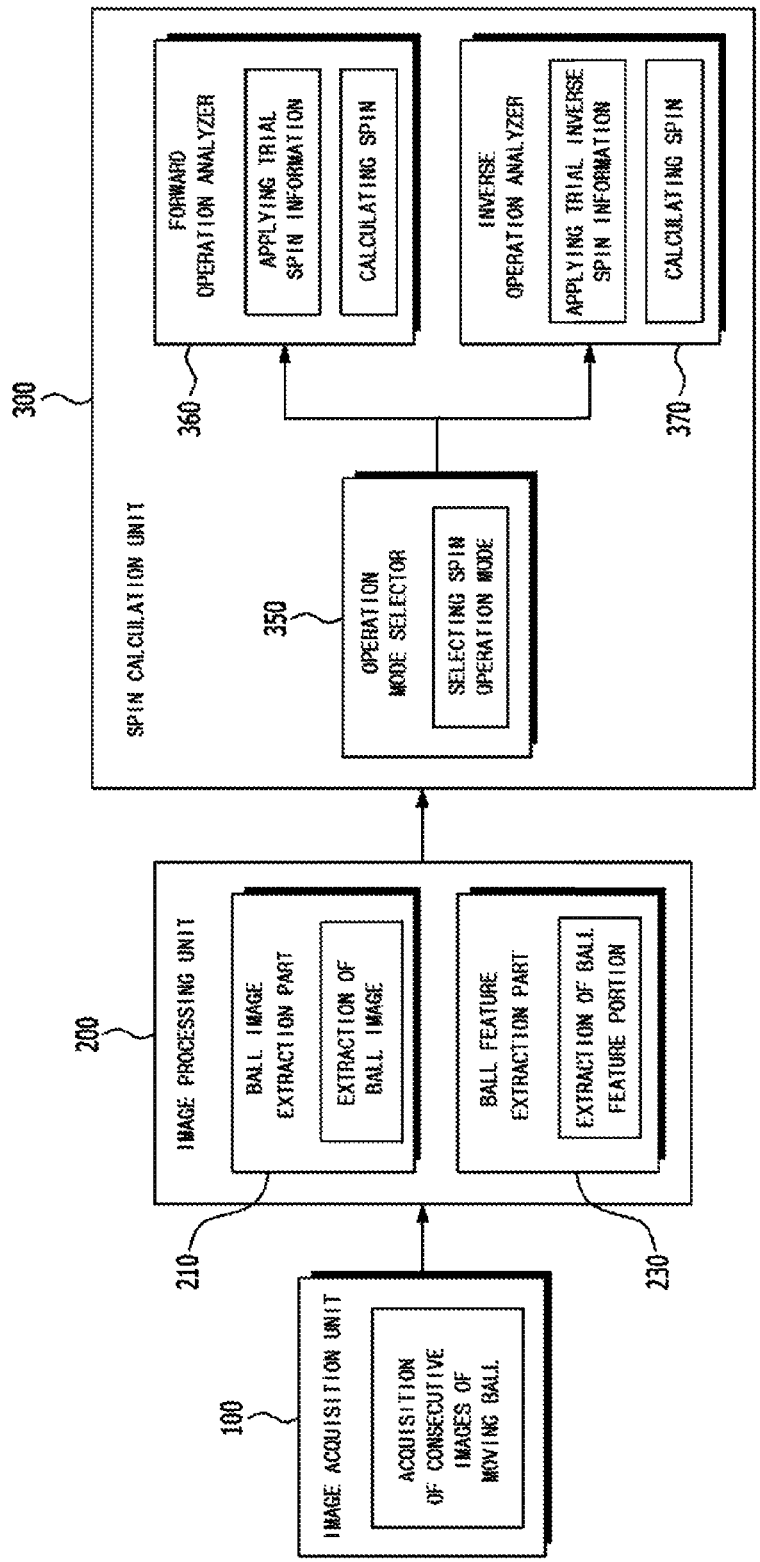
FIG. 2 is a diagram for explanation of functions of components from image acquisition to calculation of spin of a ball using components illustrated in FIG. 1.

As illustrated in FIGS. 1 and 2, an apparatus for sensing a moving ball according to an embodiment of the present invention includes an image acquisition unit 100, an image processing unit 200, and a spin calculation unit 300.

The image acquisition unit 100 may be a camera device and may be embodied through a 3D camera device or a stereo camera including a plurality of cameras, as described in the background art. FIG. 1 illustrates a case in which the image acquisition unit 100 is embodied as a stereo camera device including a first camera 110 and a second camera 120.

The image processing unit 200 is a component that extracts a ball image that is an image corresponding to a ball portion from each image acquired by the image acquisition unit 100 and removes a dimple portion and various noise portions from the ball image to extract a feature portion of the ball image, that is, an unspecified indication such as a trademark or a logo indicated on the ball, a scratch, etc.

The image processing unit 200 may include a ball image extraction part 210 and a ball feature extraction part 230.

The ball image extraction part 210 is configured to extract a ball image that is an image corresponding to a ball portion from a source image that is an image acquired by the image acquisition unit 100 and to extract a central coordinate of the ball portion, which will be described below in detail.

The ball feature extraction part 230 is a component that normalizes size, brightness, and so on of each ball image extracted by the ball image extraction part 210 and extracts the feature portion (i.e., an unspecified indication such as a trademark or a logo indicated on the ball, a scratch, etc.) indicated on the image, which will be described below in detail.

The spin calculation unit 300 is configured to analyze a position change in feature portions that are respectively extracted from two consecutive ball images, that is, to analyze a spin axis and spin amount in a predetermined three-dimensional (3D) space, by which a feature portion of a preceding image is converted into a feature portion on a next acquired image to calculate final spin axis and spin amount information of the ball. As illustrated in FIGS. 1 and 2, the spin calculation unit 300 includes an operation mode selector 350, a forward operation analyzer 360, and an inverse operation analyzer 370.

According to the present invention, analysis is basically performed in units of images among images of a consecutively photographed moving ball. When a preceding image is referred to as a first image and a next acquired image is referred to as a second image, spin when a ball state of a point for acquisition of the first image is converted into a ball state of a point for acquisition of the second image may be calculated and, in detail, may be calculated using a method of calculating a spin axis and spin amount for allowing a position of a feature portion in the first image to be converted into a position of a feature portion of the second image or to be calculated based on a result obtained by re-converting the feature portion of the feature portion on the second image into the feature portion on the first image.

That is, the spin axis and spin amount according to movement of a ball to the second image from the first image may be calculated using any one of a mode for comparing and analyzing a result obtained by applying a trial spin axis and spin amount to a feature portion on the first image with a feature portion on the second image and a mode for comparing and analyzing a result obtained by inversely applying a trial spin axis and spin amount to the feature portion on the second image with the feature portion on the first image may be selectively performed according to preset setting to calculate.

Hereinafter, the former spin operation mode will be referred to as a forward operation analysis mode and the latter spin operation mode will be referred to as an inverse operation analysis mode.

The operation mode selector 350 is a component for selecting a mode for calculating spin using feature portions of a ball, extracted from consecutively acquired images, compares the features portions of the consecutively acquired images as a target analysis, and selects a spin operation method from the forward operation analysis mode and the inverse operation analysis mode according to the comparison result, which will be described below in detail.

The forward operation analyzer 360 calculates spin information of a moving ball using the forward operation analysis mode, and the inverse operation analyzer 370 calculates spin information of a moving ball using the inverse operation analysis mode, which will be described below in detail.

Figure 3:
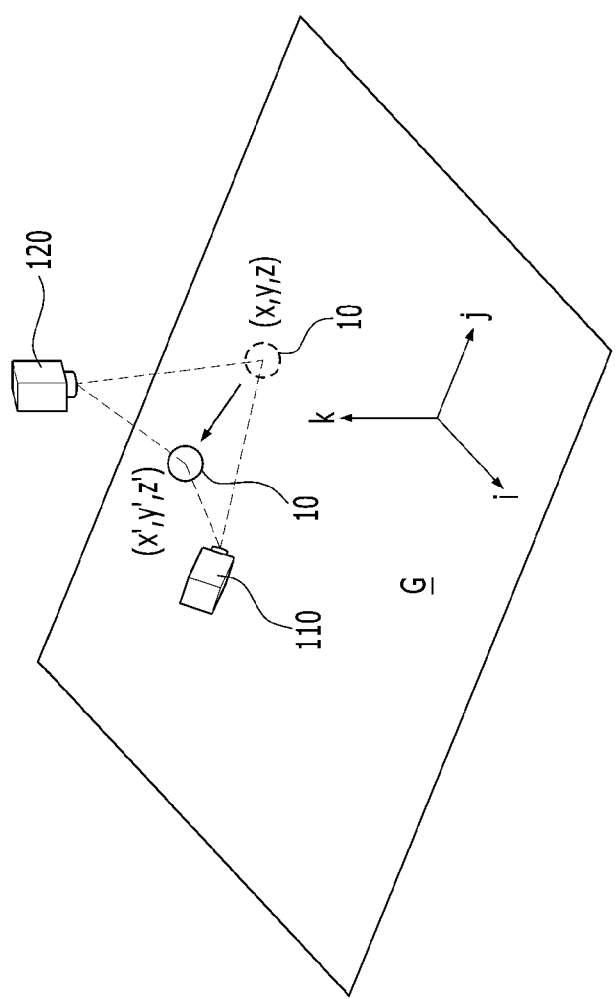
FIG. 3 is a diagram illustrating of a moving ball and two cameras configured in a stereo manner as an image acquisition unit according to an embodiment of the present invention.

As illustrated in FIG. 3, position information may be obtained at positions where ball images are respectively acquired by the first camera 110 and the second camera 120 according to movement of a ball 10 from the ball images based on an i, j, and k coordinate system of a ground surface G.

That is, the first camera 110 and the second camera 120 may each be an image acquisition device having a stereoscopic configuration, and thus, may extract 3D coordinate information of an object from images acquired by photographing the same object via two cameras, i.e., the first camera 110 and the second camera 120. In FIG. 3, as the ball 10 moves from a first position to a second position, coordinate information (x, y, z) of the first position and coordinate information (x', y', z') of the second position may be extracted.

In this case, the first camera 110 and the second camera 120 are fixed. Accordingly, position coordinates of the first camera 110 and the second camera 120 may be recognized and may always be fixed.

Figure 4A:
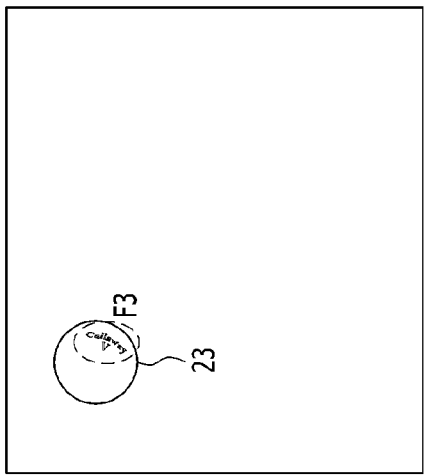
FIGS. 4(a), 4(b), and 4(c) are source images of consecutively acquired images.
Figure 4B:
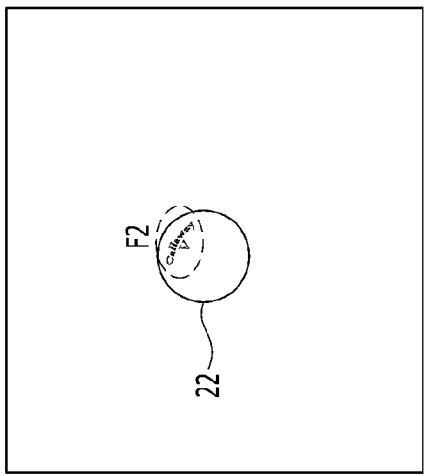
Figure 4C:
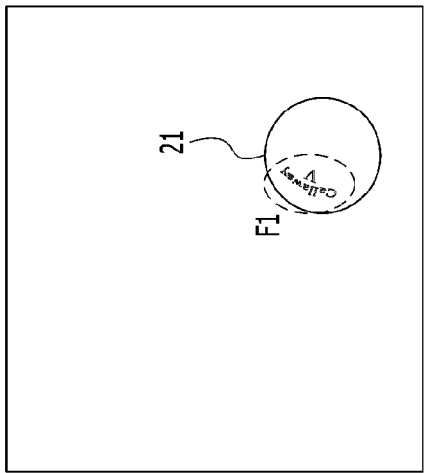

In this state, some of consecutively acquired images of any one camera are illustrated in FIGS. 4(a), 4(b), and 4(c).

That is, FIGS. 4(a), 4(b), and 4(c) illustrate images in states in which only ball portions 21, 22, and 23 remain by removing a background portion and so on using a differential image from images acquired by photographing a moving ball within a viewing angle via a fixed camera at a predetermined time interval.

As seen from FIGS. 4(a), 4(b), and 4(c), a current state is a state in which a ball flies in a left diagonal direction. As seen from FIGS. 4(a), 4(b), and 4(c), when the ball approaches a camera, the viewed ball is enlarged like the ball portion 21 as illustrated in FIG. 4(a), and then, as the ball gradually moves away from the camera, the viewed ball becomes smaller like the ball portions 22 and 23 as illustrated in FIGS. 4(b) and 4(c).

Here, the images illustrated in FIGS. 4(a), 4(b), and 4(c), that is, an image of a ball portion as a moving portion, remaining after removal of a background portion and various noise portions from an initially acquired image via a differential image, etc., is referred to as a source image.

With regard to the ball portions 21, 22, and 23 on the source image, positions of feature portions F1, F2, and F3 indicated on a surface of the ball change as the ball rotates.

Here, interest objects are the feature portions F1, F2, and F3 on the ball. In this regard, the feature portions F1, F2, and F3 may be accurately extracted and a position change of the feature portions F1, F2, and F3 may be analyzed to calculate spin of the ball.

To this end, it is necessary to effectively extract only images of the ball portions 21, 22, and 23, that is, only a ball image from the source image, as illustrated in FIG. 4.

Figure 5A:
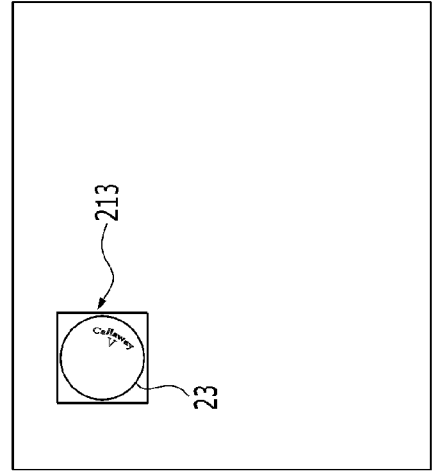
FIGS. 5(a), 5(b), and 5(c) are diagram for explanation of a procedure of extracting a ball portion from the source image illustrated in FIGS. 4(a), 4(b), and 4(c), respectively.
Figure 5B:
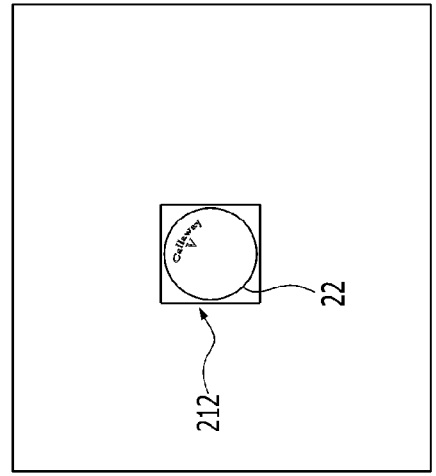
Figure 5C:
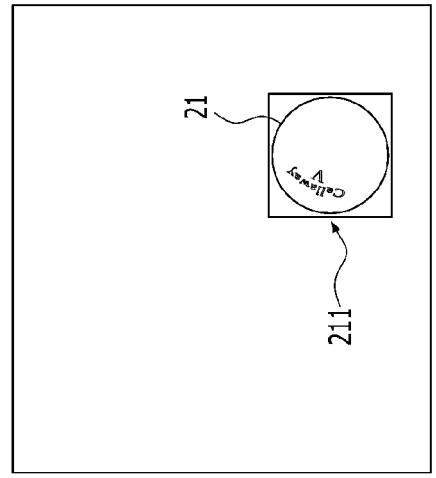
Figure 6:
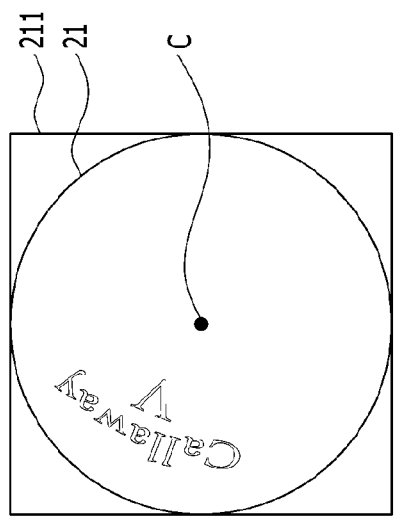
FIG. 6 is a diagram for explanation of an exemplary extraction method for extraction of a ball portion of FIG. 5.

FIGS. 5(a), 5(b), and 5(c) illustrate a procedure of extracting only a ball portion from each source image. First, the ball portions 21, 22, and 23 may be accurately extracted from source images such that a central point C of the ball portion 21 is a central portion of an extracted ball image 211 and an outline of the ball portion 21 substantially corresponds to an outline of the extracted image 211 as illustrated in FIG. 6.

Images obtained by extracting only the ball portions 21, 22, and 23 from the respective source images, that is, ball images 211, 212, and 213 have sizes corresponding to ball portions on the respective source images, and thus, have different sizes. The ball images 211, 212, and 213 indicated in the respective source images are differently affected by illumination according to a distance from a camera, and thus, brightness also varies for each respective ball image.

In order to accurately extract a ball feature portion, it is necessary to equalize the sizes of the ball images 211, 212, and 213 and normalize the brightness of the ball images 211, 212, and 213.

Figure 7C:
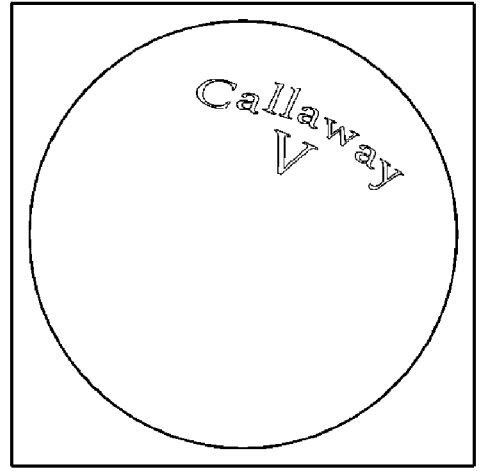
FIGS. 7(a), 7(b), and 7(c) illustrate normalized images of extracted ball images illustrated in FIGS. 5(a), 5(b), and 5(c), respectively.
Figure 7B:
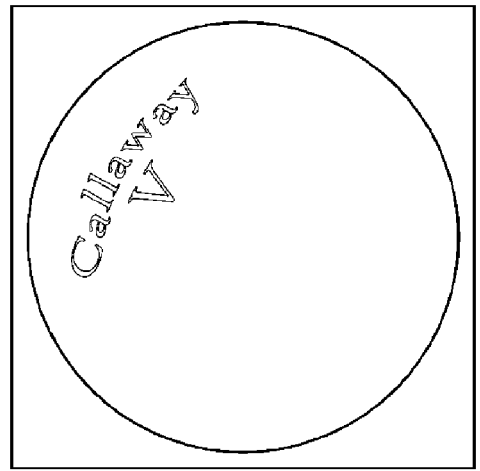
Figure 7A:
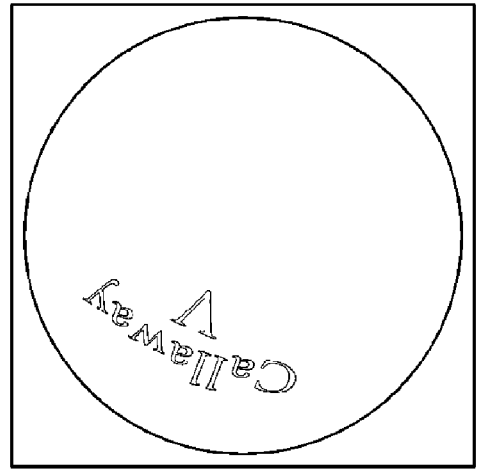

FIGS. 7(a), 7(b), and 7(c) illustrate images containing ball images corresponding to FIGS. 5(a), 5(b), and 5(c), the size and brightness of which are normalized.

That is, the ball images 211, 212, and 213 may be enlarged or reduced according to respective preset sizes or remaining ball images may be enlarged or reduced based on any one of the ball images 211, 212, and 213, that is, a normalization process may be performed on each ball image, thereby equalizing the sizes of ball images 211, 212, and 213.

In addition, a normalization process may be performed on each ball image using an average value of all pixels constituting a ball portion to equalize overall brightnesses of ball images.

As described above, after normalization is completed on each ball image, extraction of a ball feature portion using a ball feature extraction part is performed on each normalized ball image, as illustrated in FIG. 8.

Figure 8A:
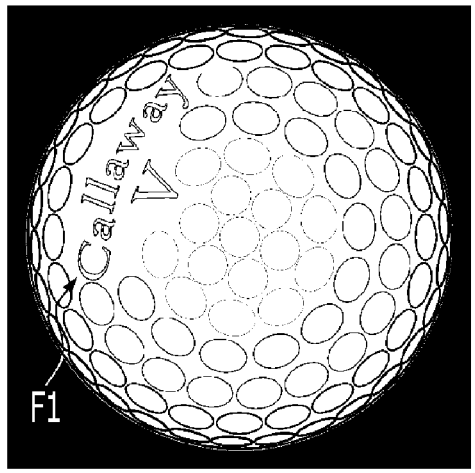
FIGS. 8(a) and 8(b) are normalized images of ball images extracted from two consecutive source images, respectively.
Figure 8B:
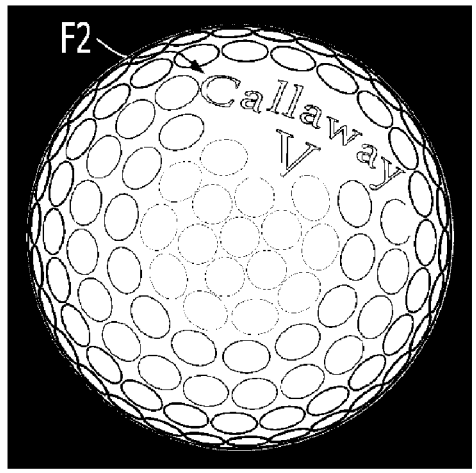
Figure 8C:
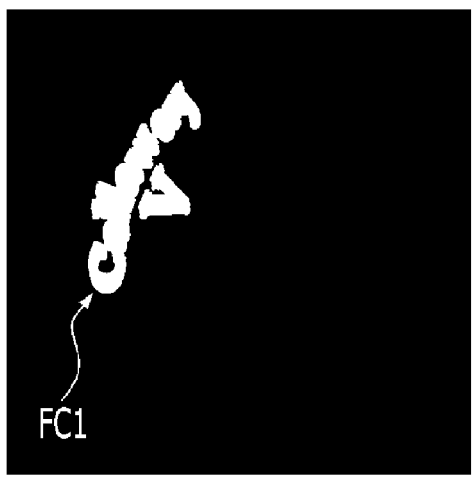
FIGS. 8(c) and 8(d) illustrate feature portion images extracted from the images illustrated in FIGS. 8(a) and 8(b)
Figure 8D:
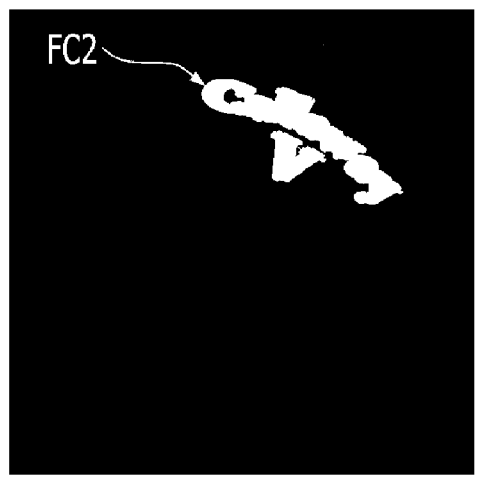

That is, when a ball image of FIG. 8(a) is a first ball image and a ball image of FIG. 8(b) is a second ball image, the first ball image is a first acquired image of two consecutively acquired images and the second ball image is a second acquired image of the two images. FIG. 8(c) illustrates a first feature portion image having a feature portion FC1 obtained by completely extracting the feature portion F1 from the first ball image. FIG. 8(d) illustrates a second feature portion image having a feature portion FC2 obtained by completely extracting the feature portion F2 on the second ball image.

Here, the feature portion may be extracted using various image processing methods such as a differential image method and so on.

When feature portion images having the extracted feature portions FC1 and FC2 are prepared, a procedure of calculating spin information of a moving ball is performed using a spin calculation unit.

Figure 9:
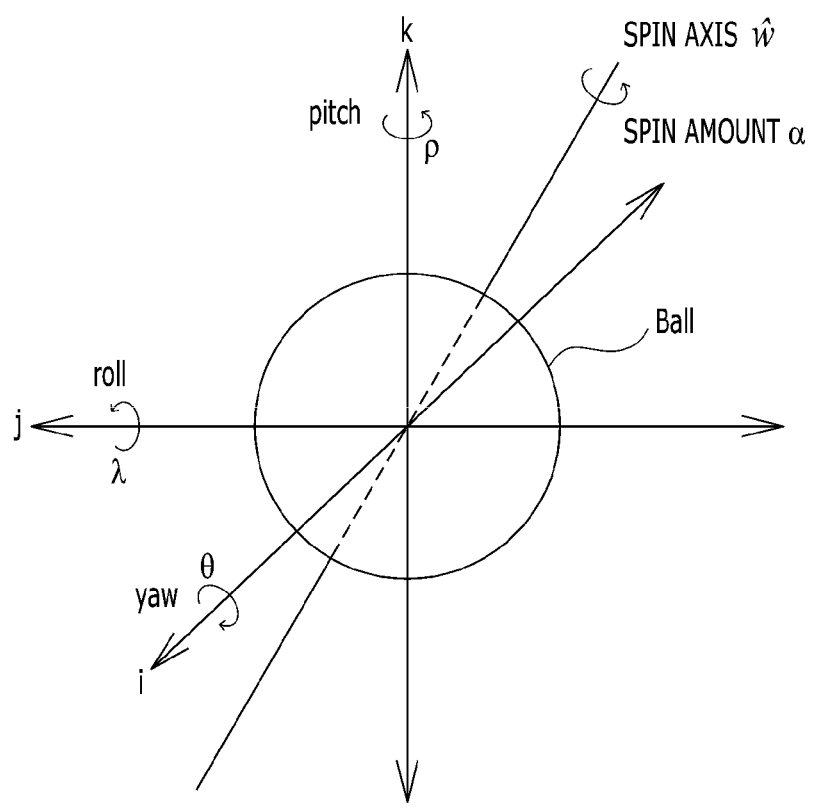
FIG. 9 is a diagram for explanation of calculation of spin of a moving ball.

Here, the spin of the ball may be calculated by calculating coordinate information about a spin axis in a 3D space based on an i-axis, j-axis, and k-axis coordinate system and an angle for rotation with respect to the spin axis, that is, information about a spin amount, as illustrated in FIG. 9.

As illustrated in FIG. 9 components for representing rotational motion in 3D space include pitch, yaw, and roll (for example, when a spin axis corresponds to a k axis, a ball has only side spin, and when the spin axis corresponds to an i axis, the ball has only back spin or forward spin). In addition, when a rotational component in an i-axis direction is 0, a rotational component in a j-axis direction is $\lambda$, and a rotational component in a k-axis direction is $\rho$, a vector of target spin may be represented according to Equation 1 below.

$$\vec{\omega} = \theta i + \lambda j + \rho k \quad \text{[Equation 1]}$$

Based on the spin vector ($\omega$), the spin axis information and the spin amount information may be calculated according to Equations 2 and 3 below, respectively. Here, $\alpha$ is the spin amount information.

$$\hat{\omega} = \left(\frac{\theta}{\alpha}, \frac{\lambda}{\alpha}, \frac{\rho}{\alpha}\right) \quad \text{[Equation 2]}$$

$$\alpha = \sqrt{\theta^2 + \lambda^2 + \rho^2} \quad \text{[Equation 3]}$$

Accordingly, the spin axis and spin amount information may be obtained by calculating $\theta$ as a yaw rotational component of spin of a moving ball, $\lambda$ as a roll rotational component, and $\rho$ as a pitch rotational component.

The spin axis and spin amount information may be obtained from a feature portion extracted from the ball image shown in FIG. 7.

That is, as illustrated in FIG. 8, the spin axis and spin amount may be extracted using feature portion images (FIGS. 8(c) and 8(d)) of two consecutive ball images.

Here, any one of a forward operation analysis mode and an inverse operation analysis mode may be determined as a spin operation method according to a feature portion of two feature portion image.

Figure 10A:
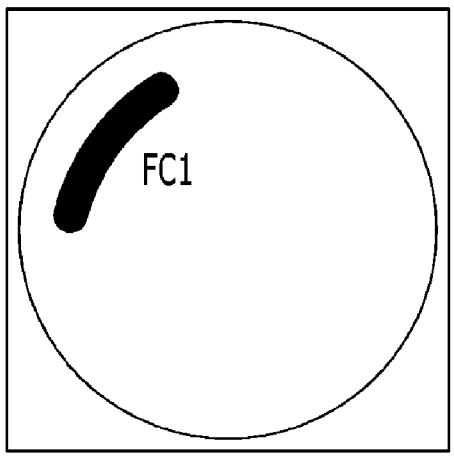
FIGS. 10 and 11 illustrate a case in which a feature portion on an image is partially lost due to rotation of a moving ball.
Figure 10B:
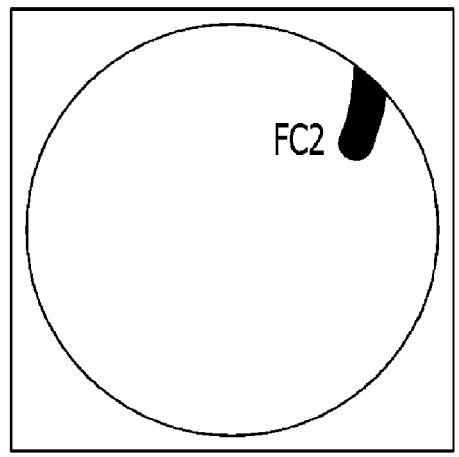
Figure 11A:
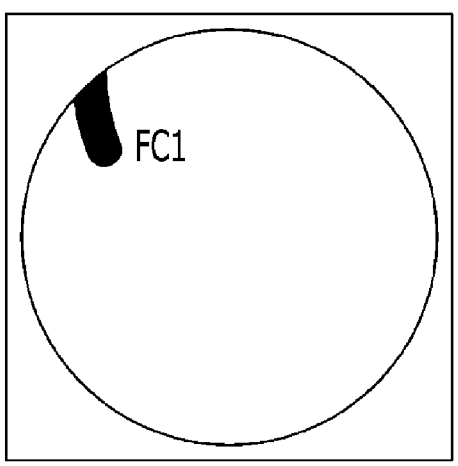
Figure 11B:
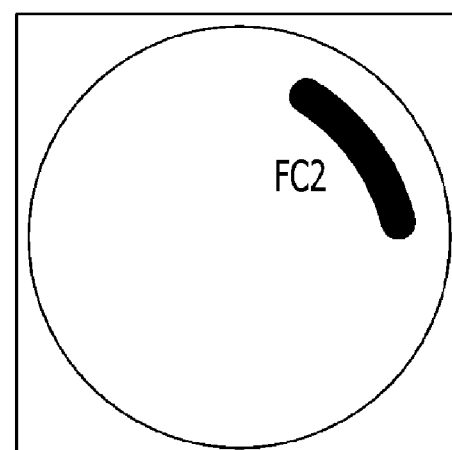
Figure 12:
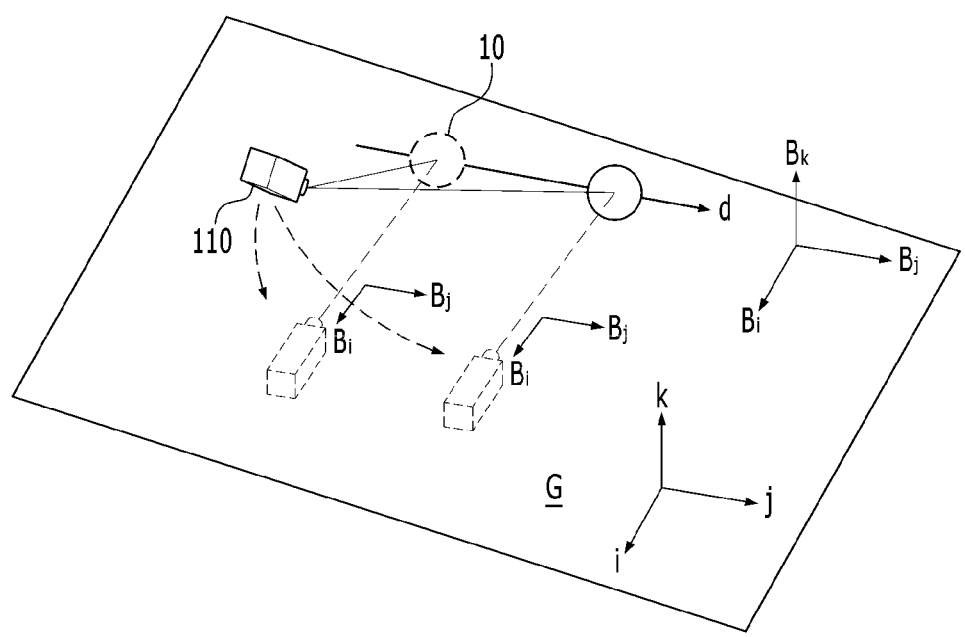
FIG. 12 is a diagram for explanation of a principle for performing correction on a position and direction of a camera for calculation of spin of a ball.

With reference to FIGS. 10 and 11, a reference for determining one of the forward operation analysis mode and the inverse operation analysis mode as a spin operation method will be described below. Here, FIGS. 10(a), 10(b), 11(a), and 11(b) illustrate the feature portion images illustrated in FIGS. 8(c) and 8(d) and illustrates a ball shape together to aid in understanding.

In FIG. 10, the first feature portion FC1 on the first feature portion image is completely shown, but the second feature portion FC2 on the second feature portion image is partially shown since a portion of the second feature portion FC2 moves back due to rotation of a ball.

In this case, comparing a size of the first feature portion FC1 and a size of the second feature portion FC2 or the number of pixels of each feature portion, the first feature portion FC1 is larger than the second feature portion FC2 or the number of pixels of the first feature portion FC1 is greater than that of the second feature portion FC2 and thus spin is calculated using a forward operation analysis mode.

However, in FIG. 11, the size of the first feature portion FC1 on the first feature portion image is smaller than that of the second feature portion FC2 on the second feature portion image or the number of pixels of the first feature portion FC1 on the first feature portion image is less than that of the second feature portion FC2 on the second feature portion image.

In this case, if pixel position information of the first feature portion FC1 (refer to FIG. 11(a)) is converted and is compared with the second feature portion FC2 (refer to FIG. 11(b)) via the forward operation analysis mode, information about whether pixels correspond may be obtained with respect to only a portion of the second feature portion FC2 but may not be obtained with respect to an entire second feature portion FC2. Thus, it is very inaccurate to calculate using the forward operation analysis mode.

Accordingly, like in FIGS. 11(a) and 11(b), comparing the size or the number of pixels of a feature portion of a preceding image and the size or the number of pixels of a subsequent image of the two consecutively acquired images, when the size of the former is smaller than that of the latter or the number of pixels of the former is less than that of the latter, spin information may be calculated by inversely finding a spin axis and spin amount using an inverse operation analysis mode.

First, a spin calculating process using the forward operation analysis mode will be described with reference to equations. The forward operation analysis mode is applied to a case in which the sizes or numbers of pixels of two feature portion are almost the same as in FIGS. 8(c) and 8(d) or the size of the first feature portion is greater than that of the second feature portion or the number of pixels of the first feature portion is greater than that of the second feature portion as in FIGS. 10(a) and 10(b).

According to Equations 4 and 5, position information of pixels constituting each of the first and second feature portions may be converted into 3D position information and represented.

$$PC1set\_3D = C1 * P1set\_3D \quad \text{[Equation 4]}$$

$$PC2set\_3D = C2 * P2set\_3D \quad \text{[Equation 5]}$$

In Equations 4 and 5, P1set_3D is a matrix obtained by converting P1set into 3D coordinate information, where P1set is a matrix of coordinates (2D coordinates) of each pixel on the first feature portion FC1 (refer to FIG. 8).

P2set_3D is a matrix obtained by converting P2set into 3D coordinate information, where P2set is a matrix of coordinates (2D coordinates) of each pixel on the second feature portion FC2 (refer to FIG. 8).

C1 and C2 are rotation matrices calculated as position correction information according to the principle illustrated in FIGS. 10 and 11, C1 is for correction of position coordinates of pixels of the first feature portion, and C2 is for correction of position coordinates of pixels of the second feature portion.

PC1set_3D is a matrix obtained by correcting positions of 3D coordinates of the pixels of the first feature portion and PC2set_3D is a matrix obtained by correcting positions of 3D coordinates of the pixels of the second feature portion.

Position correction information of C1 and C2 will now be described. With regard to positions of a ball on an image acquired by a camera, a spin axis and spin amount are differently viewed according to a direction in which the camera is directed, and thus, it is necessary to accurately establish a reference and to calculate an absolute spin axis and spin amount based on the reference. To this end, position and direction information of the camera may be corrected as if respective balls on consecutively acquired images are viewed at the same position and direction with respect to the camera, thereby accurately calculating spin information of the ball.

For example, as illustrated in FIG. 11, it is necessary to generate position correction information for correcting a position and direction of the camera 110 and to apply the position correction information to spin calculation as if the ball 10 is viewed in a direction Bi that is a vector component in parallel to the ground surface G and orthogonal to a vector component Bj corresponding to a direction in which the ball 10 proceeds, with respect to each position at which the camera 110 photographs the ball 10 while the ball 10 moves in a direction d.

In reality, when a camera is fixed and a ball flies, an image is acquired as if the ball is viewed at a fixed position. From this image, spin varies for respective positions of the ball and thus calculated spin information varies. Thus, it is difficult to accurately calculate spin. Accordingly position correction is performed as if the ball is photographed by the camera while always moving together with the camera spaced apart from the ball by a predetermined distance and then procedures for applying trial spin information and determining final spin are performed, thereby accurately calculating spin information of the ball.

When a spin axis vector as target final spin information is $\omega$ and a spin amount is $\alpha$, a rotation matrix $R(\omega, \alpha)$ may be calculated using $\omega$ and $\alpha$. A correlation of $R(\omega, \alpha)$, and PC1set_3D and PC2set_3D that are obtained by converting positions of pixels of the respective feature portions into 3D coordinate information satisfies Equation 6 below.

$$R(\omega,\alpha)*P C1set\_3D=PC2set\_3D \quad \text{[Equation 6]}$$

Equations 4 and 5 above may be substituted into Equation 6 above to obtain a correlation represented in Equation 7 below.

$$PC2set\_3D=C2T*R(\omega,\alpha)*C1*P1set\_3D \quad \text{[Equation 7]}$$

Here, C2T is transposition of matrix C2.

According to Equation 7 above, position information of the pixels of the first feature portion may be converted into 3D position information, and a resulting value may be obtained by applying position correction information and applying trial spin information to the 3D position information. That is, trial spin information may be substituted into $R(\omega,\alpha)$ as target final spin information in Equation 7 above.

When Tset_3D is a result obtained by substituting a rotation matrix $R(\omega',\alpha')$ calculated using a trial spin axis vector $\omega'$ and a trial spin amount $\alpha'$ as trial spin information into Equation 7 above, Equation 8 below is satisfied.

$$Tset\_3D=C2T*R(\omega',\alpha')*C1*P1set\_3D \quad \text{[Equation 8]}$$

When Tset is obtained by converting Tset_3D calculated according to Equation 8 above into a 2D coordinate, if Tset and P2set correspond to each other, $R(\omega',\alpha')$ and $R(\omega,\alpha)$ have the same value, and thus, $R(\omega',\alpha')$ as the trial spin information $R(\omega',\alpha')$ may be determined as final spin information.

That is, trial spin information applied to Tset closest to P2set, that is, having highest similarity among a plurality of Tset to which different trial spin information is applied may be determined as the final spin information.

If Tset and P2set are compared and the number of pixels having corresponding position coordinates is calculated, when the number of the corresponding pixels is equal to or greater than a predetermined level, or if similarity between pixels of Tset and pixels of P2set is calculated according to a predetermined function is equal to or greater than a predetermined level, trial spin information applied to the corresponding Tset is the final spin information.

Here, the similarity may be determined, for example, based on a ratio of the number of the corresponding pixels to all pixels.

With regard to feature portions extracted from two consecutively acquired images, a size of the first feature portion FC1 is smaller than a size of the second feature portion FC2 or the number of pixels of the first feature portion FC1 is less than that of the second feature portion FC2, as illustrated in FIGS. 11(a) and 11(b), spin cannot be calculated using the aforementioned forward operation analysis mode.

Accordingly, in this case, spin may be calculated using the inverse operation analysis mode.

That is, according to the forward operation analysis mode, trial spin information $R(\omega',\alpha')$ is applied to P1set that is position coordinates of pixels constituting the first feature portion. On the other hand, according to the inverse operation analysis mode, P2set that is position coordinates of pixels constituting the second feature portion as a feature portion of a subsequently acquired image inversely rotates with respect to P2set and is compared with P1set that is position coordinates of pixels constituting the first feature portion.

Equation 7 above may be modified to obtain Equation 9 below.

$$P1set\_3D=C1T*R(\omega,\alpha)T*C2*P2set\_3D \quad \text{[Equation 9]}$$

Here, a rotation matrix $R(\omega',\alpha')$ with respect to a trial spin axis vector $\omega'$ and a trial spin amount $\alpha'$ may be extracted. In addition, when a position coordinate of a feature portion obtained by inversely rotating P2set_3D around a trial spin axis by a trial spin amount is inv_Tset_3D, Equation 10 below may be satisfied.

$$inv\_Tset\_3D=C1T*R(\omega',\alpha')T*C2*P2set\_3D \quad \text{[Equation 10]}$$

In Equation 10 above, inv_Tset_3D may be converted into 2D coordinates. In addition, when the converted 2D coordinates are referred to as inv_Tset, if $R(\omega',\alpha)$ is the same as $R(\omega,\alpha)$, inv_Tset and P1set have the same value. Thus, $R(\omega',\alpha)$ obtained by inversely calculating trial inverse spin information $R(\omega',\alpha')T$ may be determined as final spin information.

That is, spin information obtained by inversely calculating trial inverse spin information applied to inv_Tset closest to P1set, that is, having highest similarity among a plurality of inv_Tset to which different trial inverse spin information is applied may be determined as the final spin information.

If inv_Tset and P1set are compared and the number of pixels having corresponding position coordinates is calculated, when the number of the corresponding pixels is equal to or greater than a predetermined level, or if similarity between pixels of inv_Tset and pixels of P1set is calculated according to a predetermined function is equal to or greater than a predetermined level, the spin information obtained by inversely calculating the trial inverse spin information applied to inv_Tset is the final spin information.

The aforementioned procedure of calculating spin of a moving ball will be described with reference to a flowchart of FIGS. 13 and 14.

Figure 13:
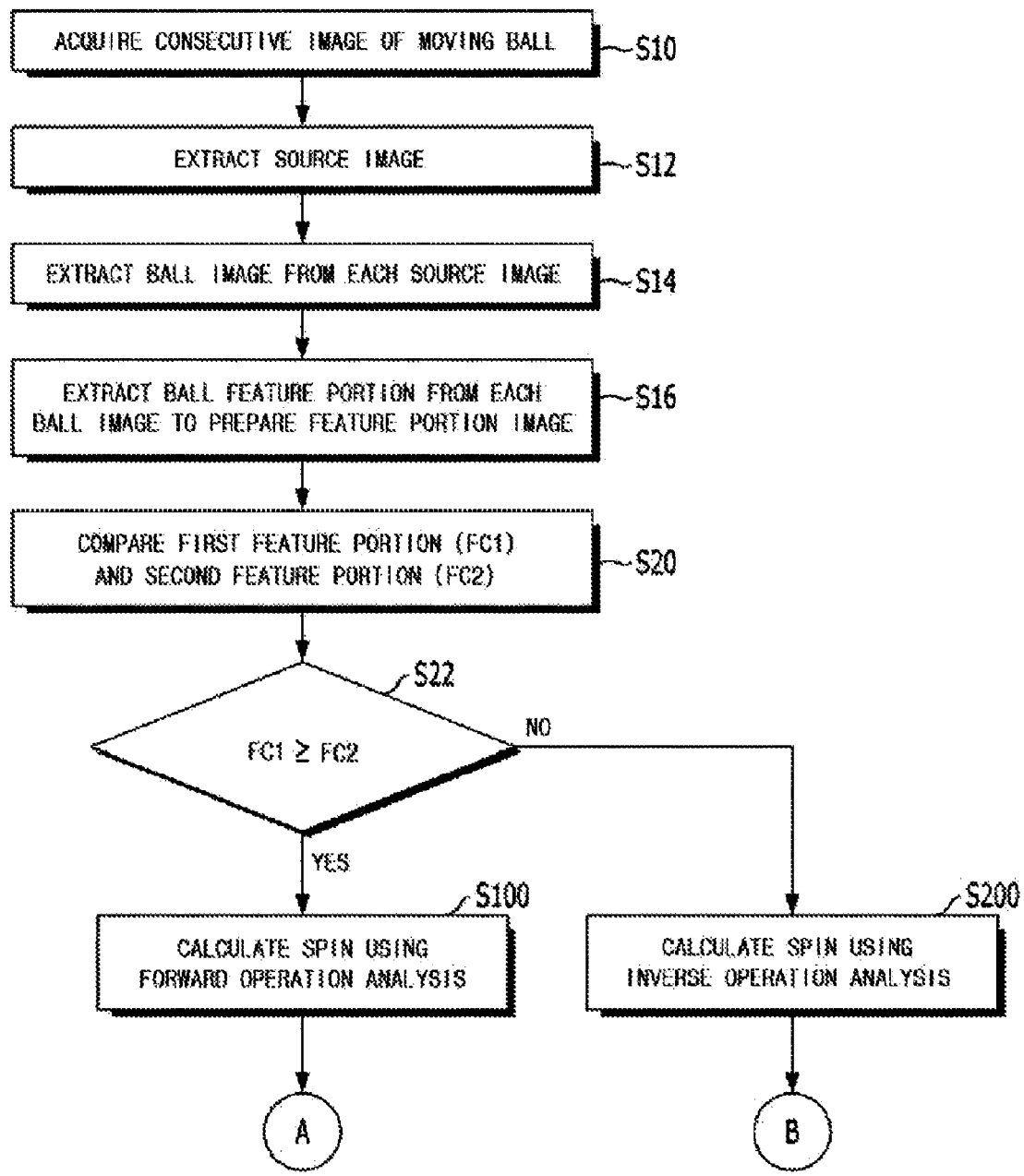
FIGS. 13 and 14 are flowcharts for explanation of a method of sensing a moving ball according to an embodiment of the present invention.
Figure 14:
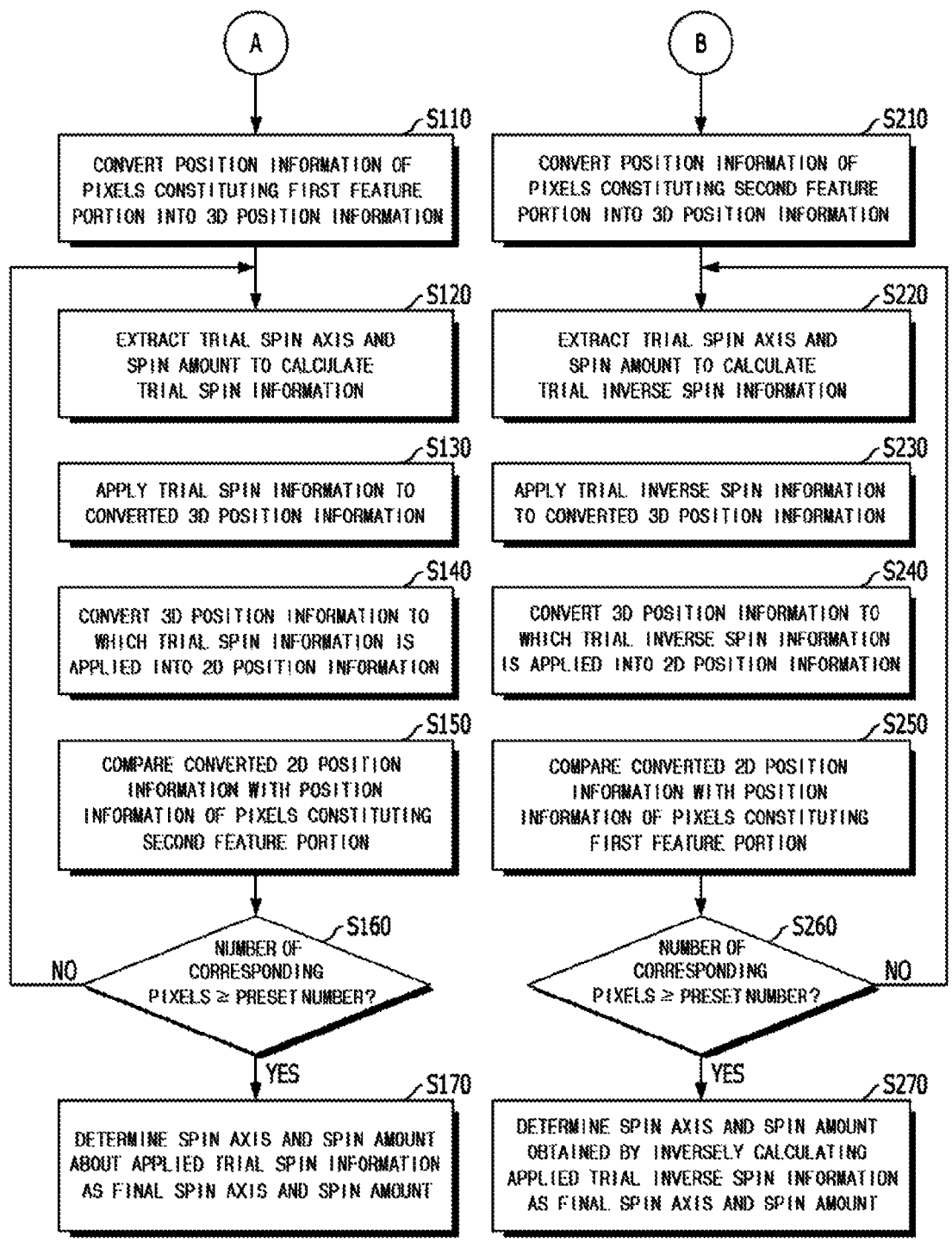

FIGS. 13 and 14 are flowcharts obtained by dividing one flowchart, and FIGS. 13A and 13B are connected to FIGS. 14A and 14B.

As illustrated in FIGS. 13 and 14, consecutive images of a moving ball are acquired (S10) and a background portion and so on are removed from each of the acquired images to extract respective source images (S12).

In addition, a ball portion is found from each source image to extract ball images (S14) and a ball feature portion is extracted from each of the ball images to prepare respective feature portion images (S16).

When a preceding image of two images among the consecutive feature portion images is referred to as a first feature portion image and a next image of the tow images is referred to as a second feature portion image, spin may be calculated using position information of pixels constituting the first feature portion FC1 on the first feature portion image and position information of pixels constituting the second feature portion FC2 on the second feature portion image.

Here, comparing the first feature portion FC1 and the second feature portion FC2, when the size of the first feature portion FC1 is equal to or greater than that of the second feature portion FC2 or the number of pixels of the first feature portion FC1 is equal to or greater than that of the second feature portion FC2 (S22), spin is calculated using a forward operation analysis mode (S100). When the size of the first feature portion FC1 is smaller than that of the second feature portion FC2 or the number of pixels of the first feature portion FC1 is less than that of the second feature portion FC2, spin is calculated using an inverse operation analysis mode (S200).

When spin is calculated using a forward operation analysis mode, position information of pixels constituting the first feature portion is converted into 3D position information (S110). In this case, position correction information may be applied as described above.

In addition, a trial spin axis and a trial spin amount are extracted to calculate trial spin information (S120), the trial spin information is applied to the converted 3D position information (S130), and the converted 3D position information is re-converted into 2D position information (S140).

The 2D position information converted in operation S140 is compared with the position information of the pixels constituting the second feature portion S150. When the number of pixels having corresponding position coordinates is calculated, if the number is equal to or greater than a preset number (S160), the applied trial spin axis and spin amount is determined as a final spin axis and spin amount (S170).

When the calculated "number of corresponding pixels" does not reach a preset number, trial spin information about other trial spin axis and spin amount is applied to repeat operations S130, S140, S150, S160, and so on, trial spin information is determined as the final spin axis and spin amount when the "number of corresponding pixels" is highest.

When spin is calculated using the inverse operation analysis mode, position information of pixels constituting the second feature portion is converted into 3D position information (S210). In this case, position correction information may be applied as described above.

A trial spin axis and spin amount are extracted and trial inverse spin information obtained by inversely calculating the trial spin axis and spin amount is calculated (S220), the trial inverse spin information is applied to the converted 3D position information (S230), and the 3D position information is re-converted into 2D position information (S240).

The 2D position information converted in operation S240 is compared with position information of pixels constituting a first feature portion (S250). When the number of pixels having corresponding position coordinates is calculated, if the number is equal to or greater than a preset number (S260), a spin axis and spin amount obtained by inversely calculating the applied trial inverse spin information are determined as a final spin axis and spin amount (S270).

When the calculated "number of corresponding pixels" does not reach a preset number, trial inverse spin information is calculated with respect to other trial spin axis and spin amount to repeat operations S230, S240, S250, S260, and so on, information obtained by inversely calculating trial inverse spin information is determined as the final spin information when the "number of corresponding pixels" is highest.

According to the aforementioned sensing apparatus and sensing method according to the present invention, when a feature portion extracted from an acquired image is partially hidden as well as when the feature portion is completely shown, a forward operation analysis mode or an inverse operation analysis mode may be appropriately performed to stably calculate spin of a moving ball.

MODE FOR INVENTION

Various embodiments have been described in the best mode for carrying out the invention.

INDUSTRIAL APPLICABILITY

A method and apparatus for sensing a moving ball according to the present invention is applicable to an industrial field related to golf training including analyzing a ball in flight according to golf swing, a so-called screen golf industrial field providing a virtual reality-based simulation to allow a user to play a virtual golf game, and so on.

The invention claimed is:

1. An apparatus for sensing a moving ball, for acquiring and analyzing an image of the moving ball to calculate spin of the moving ball, the apparatus comprising:
a camera device configured to acquire consecutive images according to movement of a ball with a surface having a predetermined feature portion indicated thereon;
an image processor configured to extract a feature portion of a ball portion on a first image as a preceding image of two consecutively acquired images and a feature portion of a ball portion on a second image as a subsequent image of the two consecutively acquired images; and
a spin calculator configured to calculate a spin axis and spin amount according to movement of a ball from the first image to the second image by selectively performing, according to preset information, any one of forward operation analysis for comparing and analyzing a result obtained by applying a trial spin axis and spin amount to the feature portion of the ball portion on the first image and the feature portion on the second image and inverse operation analysis for comparing and analyzing a result obtained by applying a trial spin axis and spin amount to the feature portion of the ball portion on the second image and the feature portion on the first image,
wherein the spin calculator comprises an operation mode selector configured to compare a size of a first feature portion as the feature portion of the ball portion on the first image with a size of a second feature portion as the feature portion of the ball portion of the second image, and to calculate spin using the forward operation analysis or the inverse operation analysis; and when the size of the first feature portion is greater than the size of the second feature portion, the operation mode selector is configured to calculate the spin using the forward operation analysis, and when the size of the first feature portion is smaller than the size of the second feature portion, the operation mode selector is configured to calculate the spin using the inverse operation analysis.

2. The apparatus according to claim 1, wherein the spin calculator comprises:

a forward operation analyzer configured to convert position information of each pixel constituting the ball portion on the first image into three-dimensional (3D) position information, to apply trial spin information about the trial spin axis and spin amount to the 3D position information, to re-convert the 3D position information into two-dimensional (2D) position information, and to compare and analyze the 2D position information with position information of each pixel of the feature portion of the ball portion on the second image to calculate spin axis and spin amount information; and an inverse operation analyzer configured to position information of each pixel constituting the ball portion on the second image into 3D position information, to apply trial inverse spin information obtained by inversely calculating the trial spin axis and spin amount to the 3D position information, to re-convert the 3D position information into 2D position information, and to compare and analyze the 2D position information with position information of each pixel of the feature portion of the ball portion on the first image to calculate spin axis and spin amount information.

3. An apparatus for sensing a moving ball, for acquiring and analyzing an image of the moving ball to calculate spin of the moving ball, the apparatus comprising:

a camera device configured to acquire consecutive images according to movement of a ball with a surface having a predetermined feature portion indicated thereon;

an image processor configured to extract a feature portion of a ball portion on a first image as a preceding image of two consecutively acquired images and a feature portion of a ball portion on a second image as a subsequent image of the two consecutively acquired images; and a spin calculator configured to calculate a spin axis and spin amount according to movement of a ball from the first image to the second image by selectively performing, according to preset information, any one of forward operation analysis for comparing and analyzing a result obtained by applying a trial spin axis and spin amount to the feature portion of the ball portion on the first image and the feature portion on the second image and inverse operation analysis for comparing and analyzing a result obtained by applying a trial spin axis and spin amount to the feature portion of the ball portion on the second image and the feature portion on the first image, wherein the spin calculator comprises an operation mode selector configured to compare a number of pixels of a first feature portion as the feature portion of the ball portion on the first image with a number of pixels of a second feature portion as the feature portion of the ball portion of the second image, to calculate spin using the forward operation analysis when the number of pixels of the first feature portion is greater than the number of pixels of the second feature portion, and to calculate the spin using the inverse operation analysis when the number of pixels of the first feature portion is less than the number of pixels of the second feature portion.

4. The apparatus according to claim 3, wherein the spin calculator comprises:

a forward operation analyzer driven by the operation mode selector when the number of pixels of the first feature portion is greater than the number of pixels of the second feature, the forward operation analyzer configured to convert position information of each pixel constituting the first feature portion into three-dimensional (3D) position information, to apply trial spin information about a trial spin axis and spin amount to the 3D position information, to re-convert the 3D position information into two-dimensional (2D) position information, and to determine a corresponding spin axis and spin amount as final spin axis and spin amount information when the 2D position information is compared with the position information of the pixels constituting the second feature portion, if the number of corresponding pixels is equal to or greater than a preset number; and an inverse operation analyzer driven by the operation mode selector when the number of pixels of the first feature portion is greater than the number of pixels of the second feature, the inverse operation analyzer configured to convert position information of each pixel constituting the second feature portion into 3D position information, to apply trial inverse spin information obtained by inversely calculating a trial spin axis and spin amount to the 3D position information, and to re-convert the 3D position information into 2D position information, and to determine spin axis and spin amount information obtained by inversely calculating the trial inverse spin information as final spin axis and spin amount information when the 2D position information is compared with the position information of the pixels constituting the first feature portion, if the number of corresponding pixels is equal to or greater than a preset number.

5. A method of sensing a moving ball, for acquiring and analyzing an image of the moving ball to calculate spin of the moving ball, the method comprising:

acquiring consecutive images according to movement of a ball with a surface having a predetermined feature portion indicated thereon;

extracting a first feature portion as a feature portion of a ball portion on a first image as a preceding image of the two consecutively acquired images and a second feature portion as a feature portion of a ball portion on a second image as a subsequent image of the two consecutively acquired images;

determining whether spin is calculated using forward operation analysis for comparing and analyzing a result obtained by applying a trial spin axis and spin amount to the first feature portion and the second feature portion or inverse operation analysis for comparing and analyzing a result obtained by applying a trial spin axis and spin amount to the first feature portion and the second feature portion; and calculating a spin axis and spin amount according to movement of a ball from the first image to the second image by selectively performing any one of the forward operation analysis and the inverse operation analysis according to a result of the determining, wherein the determining comprises:
comparing a size of the first feature portion with a size of the second feature portion;
calculating the spin using the forward operation analysis when the size of the first feature portion is greater than the size of the second feature portion; and
calculating the spin using the inverse operation analysis when the size of the first feature portion is smaller than the size of the second feature portion.

6. The method according to claim 5, wherein the calculating of the spin axis and spin amount using the forward operation analysis comprises:
converting position information of each pixel constituting the first feature portion into 3D position information;
extracting trial spin information about a trial spin axis and spin amount and applying the trial spin information to the converted 3D position information;
converting the 3D position information to which the trial spin information is applied into 2D position information;
comparing the converted 2D position information and position information of each pixel constituting the second feature portion and calculating a number of corresponding pixels; and
determining spin axis and spin amount information about the trial spin information as final spin axis and spin amount information if the number of the corresponding pixels is equal to or greater than a preset number.

7. The method according to claim 5, wherein the calculating of the spin axis and spin amount using the inverse operation comprises:
converting position information of each pixel constituting the second feature portion into 3D position information;
extracting trial inverse spin information obtained by inversely calculating a trial spin axis and spin amount and applying the trial inverse spin information to the converted 3D position information;
converting the 3D position information to which the trial inverse spin information is applied into 2D position information;
comparing the converted 2D position information and position information of each pixel constituting the first feature portion and calculating a number of corresponding pixels; and
determining spin axis and spin amount information obtained by inversely calculating the trial inverse spin information as final spin axis and spin amount information if the number of the corresponding pixels is equal to or greater than a preset number.

* * * * *